(12) United States Patent
Yamagishi

(10) Patent No.: US 7,119,966 B2
(45) Date of Patent: Oct. 10, 2006

(54) PROJECTION LENS SYSTEM AND PROJECTOR

(75) Inventor: Akira Yamagishi, Suwa (JP)

(73) Assignee: Nittoh Kogaku K. K., (JP)

( * ) Notice: Subject to any disclaimer, the term of this patent is extended or adjusted under 35 U.S.C. 154(b) by 0 days.

(21) Appl. No.: 11/087,477

(22) Filed: Mar. 23, 2005

(65) Prior Publication Data

US 2005/0219706 A1    Oct. 6, 2005

(30) Foreign Application Priority Data

Mar. 30, 2004    (JP)    ............... 2004-097850

(51) Int. Cl.
*G02B 9/00*    (2006.01)
*G02B 13/22*    (2006.01)
*G02B 15/14*    (2006.01)

(52) U.S. Cl. ............... 359/649; 359/663; 359/733

(58) Field of Classification Search ............... 359/649, 359/663, 727, 728, 754, 733–736, 793
See application file for complete search history.

(56) References Cited

U.S. PATENT DOCUMENTS 5,666,228 A * 9/1997 Yamamoto ............... 359/651
5,946,144 A * 8/1999 Yamamoto ............... 359/742
6,084,719 A * 7/2000 Sugawara et al. ......... 359/651

FOREIGN PATENT DOCUMENTS

| JP | 02-228620 | 9/1990 |
| JP | 2002-357769 | 12/2002 |
| JP | 2002-365534 | 12/2002 |
| JP | 2002-365537 | 12/2002 |

* cited by examiner

Primary Examiner—Scott J. Sugarman
Assistant Examiner—M. Hasan
(74) Attorney, Agent, or Firm—Thompson Hine LLP

(57) ABSTRACT

A projection lens system that projects projection light from a light modulator onto a screen and which is telecentric on an input side is provided. The projection lens system comprises a first meniscus lens that is disposed closest to the screen, is convex on a screen side, and has negative refractive power; and a second meniscus lens that is disposed next closest to the screen, is convex on a screen side, and has negative refractive power. The first meniscus lens is made of plastic and at least one out of two curved surfaces thereof is aspherical, and a refractive power of the first meniscus lens is lower than a refractive power of the second meniscus lens. In the projection lens system, far superior aberration-correcting performance can be achieved and a drop in aberration-correcting performance due to thermal deformation can be prevented.

3 Claims, 3 Drawing Sheets

PROJECTION LENS SYSTEM AND PROJECTOR

BACKGROUND OF THE INVENTION

1. Technical Field

The present invention relates to a projection lens system of a projector that enlarges and projects an image displayed on a light valve, such as a liquid crystal panel or a DMD, onto a screen.

2. Description of the Related Art

Japanese Laid-Open Patent Publication No. 2002-357769 discloses the use of a pair of plastic aspherical lenses in a projection lens device used in a projector. In this publication, the aspherical lens of the front side has a negative power and the aspherical lens of the rear side has a positive power, so that when these lenses made of plastic deform due to heat and the refractive powers thereof change, the effects of such deformation are cancelled out by one lens having a positive power and the other lens having a negative power, which suppresses the drop in aberration-correcting performance.

Aspherical lenses are often introduced into lens systems to correct aberration at a high level using a small number of lenses. Aspherical lenses can be realized by glass lenses, but due to cost and the ease of machining, plastic lenses are often used. However, since plastic lenses have a high coefficient of thermal expansion, changes in form due to heat conversely cause a drop in aberration performance. In particular, in a rear projector such as that shown in FIG. 1, a projection lens system is disposed in a completely closed environment and so is more susceptible to the effects of heat compared to a conventional projector system in which the screen and projector are separate and at least part of the lens system is exposed.

The rear projector 1 shown in FIG. 1 includes, inside a housing 2, a light source 3, a light modulator (light valve) 4 that modulates light from the light source 3 according to an image signal to form an image, a projection lens system 5 that projects projection light 8 from the light valve 4 onto a screen 9 from the rear surface side, and mirrors 6 and 7 that reflect and guide the projection light 8 to the screen 9. Although there are cases where a CRT, in which the light source 3 and the light valve 4 are integrated, is used, in recent years liquid crystal panels have often been utilized as the light valve 4, and there are also cases where a DMD panel, formed of micromirror elements, is utilized. In the case of a DMD panel, the light valve 4 is a reflective-type, so that the positional relationship with respect to the light source 3 differs to that shown in FIG. 1. However, the input (incident) side of the projection lens system 5 is telecentric regardless of whether a liquid crystal panel or a DMD panel is used as the light valve 4. Accordingly, a projection lens system 5 that enlarges and projects the modulated light (projection light) 8 and is telecentric on the input (incident) side is required.

In view of the precision of aspherical surfaces, it is easier to form a suitable surface for correcting aberration when the area to be aspherized is large. However, increasing the lens diameter of an aspherical lens has the demerits of a large increase in cost for a lens made of glass and of increased effects due to thermal deformation for a lens made of plastic. In a projection lens system, the lens closest to the screen has the largest diameter, but as disclosed in Japanese Laid-Open Patent Publication No. 2002-357769, in many cases it is not the lens closest to the screen but the next lens or a lens located at an intermediate position that is aspherized.

In a lens system with an extremely simple construction where the lens system is constructed of only a few lenses, the number of surfaces at which an aspherical surface can be introduced is limited. Therefore, there are cases where one or both surfaces of the lens closest to the screen that has the largest diameter is/are aspherized. With a lens system of such a simple construction, for a conventional projector that is separated from the screen, the lens closest to the screen is subject to the weakest thermal effects and so hardly deforms due to heat. Also, since a simple system is not expected to achieve a particularly high aberration correcting performance, the aspherical lens is only provided with a corrective performance such that thermal deformation of the aspherical lens will not have an especially large effect on the aberration performance of the entire lens system.

However, in the rear projectors that are currently being introduced, due to conditions relating to the placement of the lens system, the effect of heat is much greater than in a conventional projector. Image quality that is at least equal to that achieved by current CRTs and liquid crystal TVs is also required. In addition, low cost remains a constant requirement. In a method, such as that described in Japanese Laid-Open Patent Publication No. 2002-357769, that overcomes the effects of thermal deformation of aspherical lenses by increasing the number of aspherical lenses, the cost required to design and manufacture the aspherical lenses increases, and it is necessary to improve the design precision and raise the manufacturing yield so as to avoid a drop in the aberration performance due to thermal deformation of the additional aspherical lenses, which also results in high costs.

For this reason, it is an object of the present invention to provide a projection lens system that has high aberration-correcting performance, that can suppress deterioration in the aberration-correcting performance due to heat, and that can be supplied at low cost.

SUMMARY OF THE INVENTION

A projection lens system according to the present invention projects projection light from a light modulator onto a screen and is telecentric on an input (incident) side, the projection lens system including: a first meniscus lens that is disposed closest to the screen, is convex on a screen side, and has negative refractive power; and a second meniscus lens that is disposed next closest to the screen, is convex on a screen side, and has negative refractive power, wherein a lens group closest to the screen is composed of multiple lenses, the first meniscus lens is made of plastic, at least one out of two curved surfaces of the first meniscus lens is aspherical, and the power distribution is such that a refractive power of the first meniscus lens is lower than a refractive power of the second meniscus lens. With an arrangement with this power distribution, the lens arrangement can be chosen with greater freedom when paraxial radii of curvature of both curved surfaces of the first meniscus lens are larger than a radius of curvature of a surface on the screen side of the second meniscus lens that comes next.

When designing a conventional lens system, the power distribution of the respective lenses constructing the lens system is set so that a desired aberration performance or an aberration performance close to the desired performance is achieved, and after this one of the surfaces is made aspherical to further improve the aberration correcting performance. For this reason, plastic lenses that are to be aspherized have a significant power in the arrangement of the lens system, and therefore the effects of the thermal deformation of the plastic lenses on the aberration-correcting performance of the lens system act so that the fluctuations in power and deformation of the aspherical surface are multiplied.

On the other hand, in the projection lens system of the present invention, the fundamental refractive power of the first meniscus lens is weaker than the other lenses. In addition, both curved surfaces or one curved surface of the first meniscus lens is aspherized so as to have an aberration-correcting performance. That is, in the projection lens system according to the present invention, the power distribution of the respective lenses is designed with priority given to the aspherizing and the fundamental design is that the first meniscus lens is aspherized without being distributed much power.

In a projection lens system that projects projection light from a light valve such as a liquid crystal panel or a DMD onto a screen, the input side is designed so as to be telecentric with a long back focus, and to reduce the diameter of the first lens that is closest to the screen and has the largest aperture, the first lens is often constructed of a meniscus lens with a negative refractive power. To design a lens system that is compact and has a large field angle, the refractive power of the lens closest to the screen is also increased. Conventionally, if the first lens is aspherized, the effects of thermal deformation on the correcting performance for various kinds of aberration are pronounced, and therefore the aspherical lens is disposed behind the first lens.

When a meniscus lens, for which the radii of curvature of both surfaces are in the same direction, of negative refractive power is used as in the projection lens system according to the present invention, by reducing the refractive power of the lens, it is possible to have curved surfaces while reducing the difference in thickness between the central part and the outer parts of the lens. This means that by reducing the refractive power of a meniscus lens, the fluctuation in the range of the refractive power due to thermal deformation is reduced, and the drop in aberration-correcting performance due to deformation of the aspherical surface is reduced even for a large diameter lens such as the first meniscus lens.

Since the first meniscus lens that is closest to the screen has the largest aperture, it is easy to machine the lens with an aspherical surface of a shape suited to correcting aberration. Therefore, the first meniscus lens has the merit of being suited to being aspherized to correct aberration. Accordingly, in the present invention, a lens that is suited to correcting aberration is aspherized and the effects of thermal deformation of this lens are suppressed. Also, if the first meniscus lens has a large diameter, it will be possible to form an aspherical surface of a sufficient shape for correcting aberration even if the refractive power is reduced, so that the first meniscus lens can be designed so as to sufficiently contribute to the aberration-correcting performance of the lens system even if the power thereof is reduced.

In one aspect of this invention, a projection lens system has an arrangement of eleven lenses that include the first meniscus lens and the second meniscus lens and are respectively negative, negative, negative, positive, negative, positive, positive, negative, positive, positive, and positive in order from the screen side, by making only the first meniscus lens an aspherical lens, it is possible to obtain superior image forming performance to the lens system disclosed in Japanese Laid-Open Patent Publication No. 2002-357769 mentioned above that is constructed of eleven lenses and includes two aspherical lenses.

In this way, by giving priority to the power distribution of a lens system, lowering the power of a first meniscus lens, and aspherizing the first meniscus lens, it is possible to suppress the effects of thermal deformation of an aspherical lens on the overall aberration-correcting performance. Accordingly, to suppress the effects of thermal deformation of an aspherical lens, it is not necessary to introduce extra aspherical lenses which would increase the cost incurred by design and manufacturing. Therefore, it is possible to provide, at low cost, a projection lens system that has high aberration-correcting performance through the use of an aspherical lens but for which there is little deterioration in aberration-correcting performance due to heat.

With a projector that includes the projection lens system according to the present invention and a light modulator, it is possible to stably display high-quality images even as an apparatus, such as a rear projector, where the entire lens system is susceptible to becoming hot.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

First Embodiment

Figure 1:
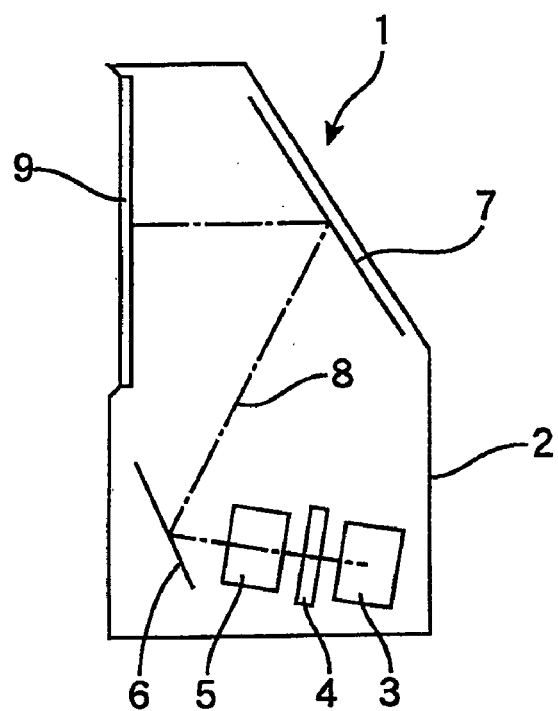
FIG. 1 is a diagram schematically showing the arrangement of a rear projector.
Figure 2:
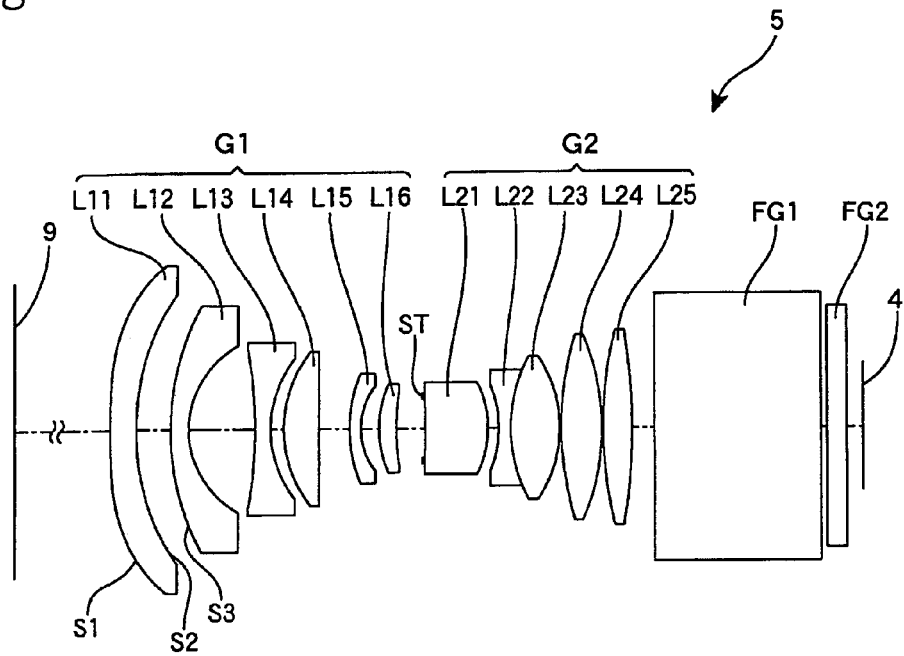
FIG. 2 is a diagram showing the arrangement of a projection lens system according to the present invention.

FIG. 2 shows the lens arrangement of a projection lens system 5 according to the present invention. The projection lens system 5 of the present embodiment is composed of eleven lenses L11 to L16 and L21 to L25 arranged in order from a screen 9 side (output side) toward a light valve 4 side (input side or incident side). These lenses L11 to L16 and L21 to L25 can be divided at a "stop" (aperture) ST into a former group G1 that has a negative overall refractive power and a latter group G2 that has a positive overall refractive power. Parallel glasses FG1 and FG2 disposed between the projection lens system 5 and the light valve 4 are optical low-pass filters.

The former group G1 is composed of six lenses that in order from the side of the screen 9 are negative meniscus lenses L11 and L12 that are convex on the screen side, a bi-concave negative lens L13, a convex lens L14 that is almost flat on the light valve side, a negative meniscus lens L15 that is convex on the screen side, and a positive meniscus lens L16 that is convex on the screen side. Both surfaces S1 and S2 of the first meniscus lens L11 are aspherical.

The latter group G2 is composed of five lenses that in order from the side of the screen 9 are a thick positive meniscus lens L21 that is concave on the screen side, a bi-concave negative lens L22 and a bi-convex positive lens L23 that compose a cemented lens, and two bi-convex positive lenses L24 and L25.

This lens system 5 is a retrofocus-type lens system in which lens groups with negative and positive powers are disposed from the screen side, and is telecentric on input side that is side of the light valve 4, which makes the lens system suited to a projector in which the light valve 4 is a liquid crystal panel or a DMD. To make the refractive power of the former group G1 negative and to achieve a telecentric-type lens system, the lens system has an overall arrangement of eleven lenses that are negative, negative, negative, positive, negative, positive, positive, negative, positive, positive, and positive in order from the screen side, in particular a lens with negative power is used as the fifth lens L15.

In the lens data shown below, "No." represents the number of the lens surface counting in order from the screen 9 side, "R" represents the radius of curvature (mm) of each lens surface, "D" represents the distance (mm) between the respective lens surfaces, "nd" represents the refractive index (d line) of each lens, and "vd" represents the Abbe number (d line) of each lens. Also, the expression "inf" indicates a flat surface. The same expressions are also used in the following embodiments.

Lens Data (No. 1)

| No | R | D | nd | vd | |
|---|---|---|---|---|---|
| 1 | 176.210 | 4.00 | 1.49180 | 57.2 | lens L11 |
| 2 | 49.914 | 5.39 | | | |
| 3 | 42.878 | 2.80 | 1.58913 | 61.3 | lens L12 |
| 4 | 15.318 | 10.42 | | | |
| 5 | −70.231 | 2.40 | 1.48749 | 70.4 | lens L13 |
| 6 | 18.492 | 2.06 | | | |
| 7 | 20.437 | 5.45 | 1.74950 | 35.0 | lens L14 |
| 8 | −4480.022 | 4.84 | | | |
| 9 | 22.762 | 1.80 | 1.58913 | 61.3 | lens L15 |
| 10 | 11.259 | 2.84 | | | |
| 11 | 16.790 | 2.74 | 1.78472 | 25.7 | lens L16 |
| 12 | 41.647 | 4.06 | | | |
| 13 | inf | 0.44 | | | stop ST |
| 14 | −108.605 | 10.00 | 1.48749 | 70.4 | lens L21 |
| 15 | −15.904 | 1.72 | | | |
| 16 | −18.371 | 1.90 | 1.84666 | 23.8 | lens L22 |
| 17 | 24.354 | 7.77 | 1.49700 | 81.6 | lens L23 |
| 18 | −20.843 | 0.25 | | | |
| 19 | 53.385 | 6.46 | 1.49700 | 81.6 | lens L24 |
| 20 | −36.713 | 0.20 | | | |
| 21 | 64.207 | 4.38 | 1.84666 | 23.8 | lens L25 |
| 22 | −103.247 | 3.50 | | | |
| 23 | inf | 26.00 | 1.51680 | 64.2 | filter FG1 |
| 24 | inf | 1.00 | | | |
| 25 | inf | 3.00 | 1.48749 | 70.4 | filter FG2 |
| 26 | inf | 2.67 | | | |

The first meniscus lens L11 is made of plastic and both the first surface (S1) and the second surface (S2) thereof are aspherical. The aspherical coefficients of these surfaces are as follows.

The First Surface (S1)
R=176.210, K=0.0000
A=2.35775×10$^{-5}$, B=−3.85714×10$^{-8}$
C=5.14722×10$^{-11}$, D=−2.14256×10$^{-14}$ The aspherical surfaces are expressed by the following Expression (1) using the coefficients K, A, B, C, and D given above with X as the coordinate in the optical axis direction, Y as the coordinate in a direction perpendicular to the optical axis, the direction in which light propagates as positive, and R as the paraxial radius of curvature. This is also the case hereinafter.

$$X=(1/R)^2Y/[1+\{1-(1+K)(1/R)^2Y^2\}^{1/2}]+AY^4+BY^6CY^8+DY^{10} \qquad (1)$$

The Second Surface (S2)
R=49.914, K=0.0000
A=1.87132×10$^{-5}$, B=−6.03735×10$^{-8}$
C=1.18156×10$^{-10}$, D=−9.00210×10$^{-14}$ Various parameters of the projection lens system 5 are as follows.
Overall combined focal length f (mm): 11.61
Overall length (mm): 81.92

In the projection lens system 5, the first meniscus lens L11 that is disposed closest to the screen and is convex on the screen side is made of plastic, both curved surfaces S1 and S2 thereof are aspherical, and the paraxial radii of curvature of both curved surfaces S1 and S2 are larger than the radius of curvature of the surface S3 on the screen side of the second meniscus lens L12 and the refractive power of the first lens L11 is suppressed so as to be lower than that of the second lens L12. In this lens system 5, the large aperture lens L11 closest to the screen is an aspherical lens, so that the aberration-correcting performance is high. In addition, although the aspherical lens has a large aperture, the manufacturing cost is suppressed by using only one such lens, making the lens system 5 a lens system with high image forming performance at low cost. Also, the radii of curvature of both surfaces of the aspherical lens L11 are larger than the radius of curvature of the next surface of the next lens L12. Therefore, although the lens L11 is a meniscus-type negative lens disposed closest to the screen, the lens L11 is designed so as to the refractive power being kept low and no large difference is made in thickness between the central periphery of the lens and the outer parts. Accordingly, although the lens L11 is a large-aperture aspherical lens that is made of plastic, and even if the lens is used in an environment where the temperature becomes high where deformation could occur due to such lens being plastic, there will be no large fluctuations in the refractive power of the lens member due to such deformation, so that the effects of heat are limited. In addition, since the lens has a large aperture, the aspherical surface is easier to design than a small aperture lens, and it is possible to use a surface shape that takes into account a certain degree of deformation due to heat.

Figure 3:
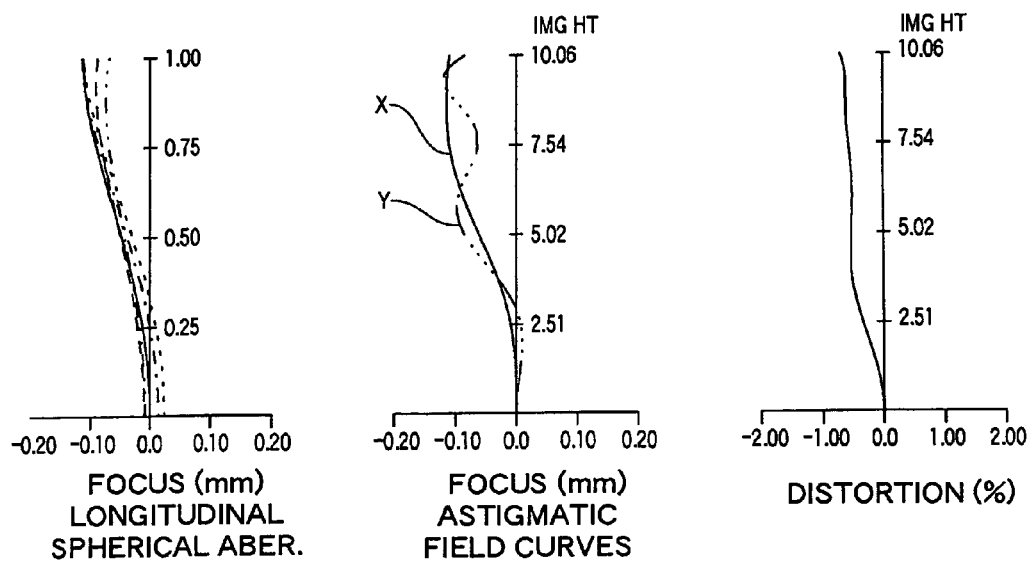
FIG. 3 is a series of graphs showing various aberrations of the lens system shown in FIG. 2.

FIG. 3 shows the spherical aberration, astigmatism, and distortion of the projection lens system 5. Values of the spherical aberration are given for the respective wavelengths 670 nm (dotted line), 620 nm (dot-dash line), 546 nm (solid line), 460 nm (dash line), and 430 nm (dot-dot-dash line). As shown in the drawings, the longitudinal aberration of the lens system 5 of the present embodiment is kept within a range of around ±0.1 mm, and the distortion is kept within a range of around 1%. These aberration values are far superior to the various aberration values of the referenced projection lens system disclosed in Japanese Laid-Open Patent Publication No. 2002-357769 mentioned above that is constructed with the same number of lenses (i.e., eleven lenses), has a negative meniscus lens on the screen side and is telecentric on the input (incident) side. Accordingly, it can be understood that the lens system 5 according to the present invention that has only one aspherical meniscus lens L11 closest to the screen can provide far superior image forming performance to the referenced lens system that uses two aspherical lenses.

Second Embodiment

Figure 4:
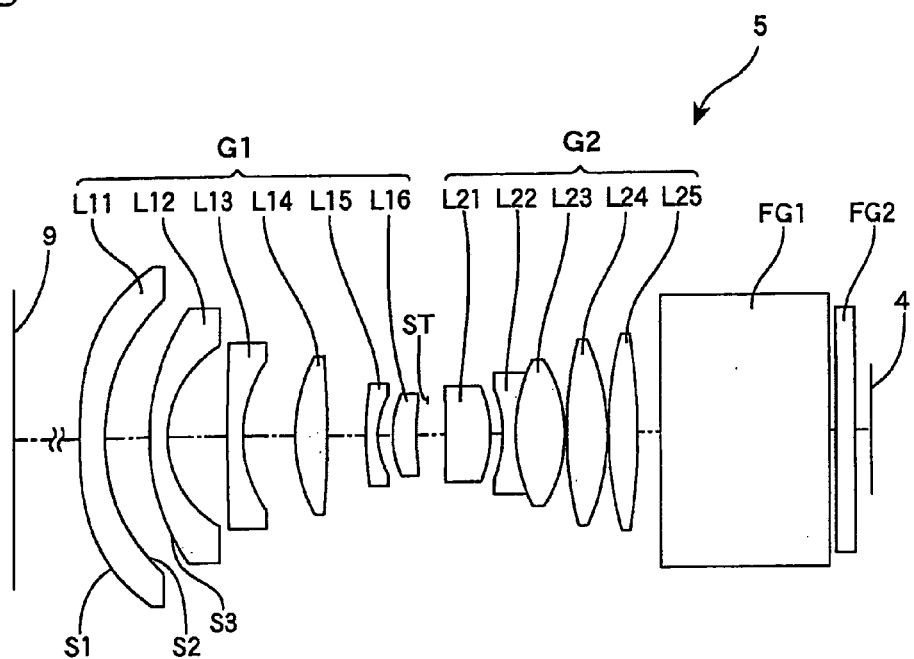
FIG. 4 is a diagram showing a different example of a projection lens system according to the present invention.

FIG. 4 shows the lens arrangement of a different projection lens system 5 according to the present invention. The projection lens system 5 according to the present embodiment is also composed of eleven lenses that are divided into two groups at the stop ST. From the screen 9 side, the former group G1 is composed of six lenses L11 to L16 and the latter group G2 is composed of five lenses L21 to L25. The fundamental shapes of these lenses L11 to L16 and L21 to L25 are the same as in the first embodiment, and therefore the projection lens system 5 of the present embodiment is also a lens system with an overall construction of eleven lenses that are negative, negative, negative, positive, negative, positive, positive, negative, positive, positive, and positive in order from the screen side. Detailed data on these lenses is given below.

Lens Data (No. 2)

| No | R | D | nd | vd | |
|----|---|---|----|----|---|
| 1 | 81.466 | 4.00 | 1.49180 | 57.2 | lens L11 |
| 2 | 37.008 | 6.82 | | | |
| 3 | 35.560 | 2.80 | 1.58913 | 61.3 | lens L12 |
| 4 | 16.235 | 9.53 | | | |
| 5 | 456.823 | 2.40 | 1.58913 | 61.3 | lens L13 |
| 6 | 20.240 | 8.35 | | | |
| 7 | 26.554 | 4.92 | 1.80610 | 33.3 | lens L14 |
| 8 | −180.497 | 6.11 | | | |
| 9 | 60.757 | 1.80 | 1.58913 | 61.3 | lens L15 |
| 10 | 12.249 | 2.37 | | | |
| 11 | 16.128 | 3.65 | 1.69895 | 30.1 | lens L16 |
| 12 | 48.223 | 1.72 | | | |
| 13 | inf | 2.78 | | | stop ST |
| 14 | −341.014 | 7.07 | 1.49700 | 81.6 | lens L21 |
| 15 | −18.761 | 1.89 | | | |
| 16 | −19.520 | 1.90 | 1.84666 | 23.8 | lens L22 |
| 17 | 25.684 | 7.67 | 1.49700 | 81.6 | lens L23 |
| 18 | −21.689 | 0.25 | | | |
| 19 | 60.515 | 6.22 | 1.49700 | 81.6 | lens L24 |
| 20 | −35.791 | 0.20 | | | |
| 21 | 59.234 | 4.48 | 1.80518 | 25.5 | lens L25 |
| 22 | −101.758 | 3.50 | | | |
| 23 | inf | 26.00 | 1.51680 | 64.2 | filter FG1 |
| 24 | inf | 1.00 | | | |
| 25 | inf | 3.00 | 1.48749 | 70.4 | filter FG2 |
| 26 | inf | 2.65 | | | |

The first meniscus lens L11 is made of plastic and both the first surface (S1) and the second surface (S2) thereof are aspherical. The aspherical coefficients of these surfaces are as follows.

The First Surface (S1)
R=81.466, K=0.0000
A=2.35775×10$^{-5}$, B=−3.85714×10$^{-8}$
C=5.14722×10$^{-11}$, D=−2.14256×10$^{-14}$ The Second Surface (S2)
R=37.008, K=0.0000
A=1.87132×10$^{-5}$, B=−6.03735×10$^{-8}$
C=1.18156×10$^{-10}$, D=−9.00210×10$^{-14}$ Various parameters of the lens system 5 of the present embodiment are as follows.
Overall combined focal length f (mm): 11.65
Overall length (mm): 86.92

This lens system 5 is also a retrofocus-type lens system in which a former lens group G1 with negative refractive power and a latter lens group G2 with positive refractive power are disposed from the screen side, and is telecentric on the light valve 4 side, which makes the lens system suited to a projector in which the light valve 4 is a liquid crystal panel or a DMD. Also, the first meniscus lens L11, which has negative power, is disposed closest to the screen and is convex on the screen side, is made of plastic and both curved surfaces S1 and S2 thereof are aspherical. The paraxial radii of curvature of both curved surfaces S1 and S2 of the first lens L11 are larger than the radius of curvature of the surface S3 on the screen side of the second meniscus lens L12 and the first lens L11 is designed so that the refractive power is suppressed so as to be lower than that of the second lens L12. Accordingly, with this lens system 5 also, by using an aspherical lens with a large aperture, the aberration-correcting performance can be increased, while at the same time, the effects of thermal deformation of the aspherical lens on the system can be limited.

Figure 5:
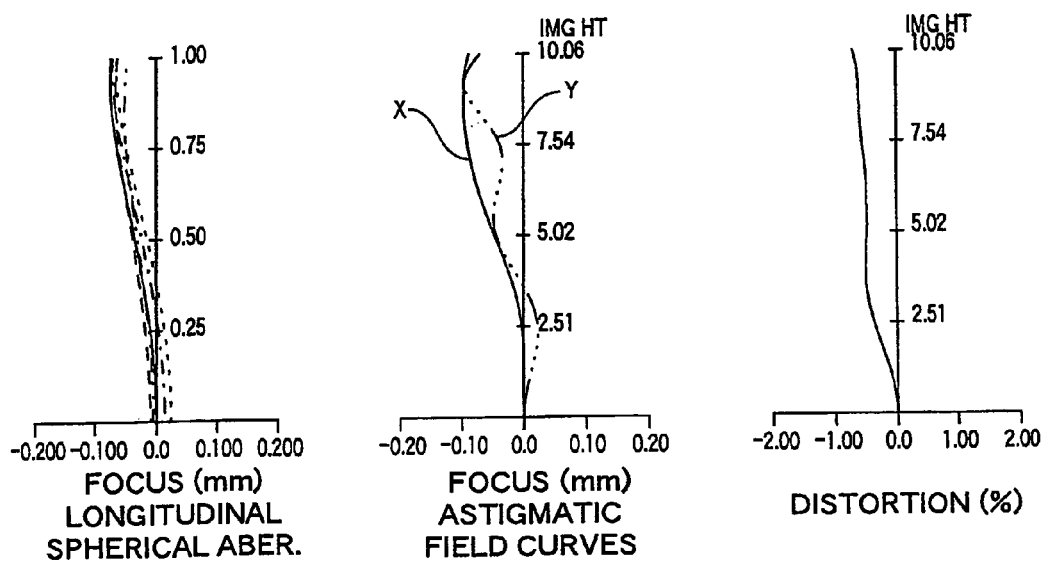
FIG. 5 is a series of graphs showing various aberrations of the lens system shown in FIG. 4.

FIG. 5 shows the spherical aberration, astigmatism, and distortion of the projection lens system 5. As shown in the drawings, the longitudinal aberration of the lens system 5 of the present embodiment is kept within a range of around ±0.1 mm, and the distortion is kept within a range of around 1%. These levels of aberration are far superior to the various values of aberration of the referenced projection lens system disclosed in Japanese Laid-Open Patent Publication No. 2002-357769 mentioned above that is constructed with the same number of lenses (i.e., eleven lenses). Accordingly, it can be understood that the lens system 5 according to the present invention that has the single aspherical meniscus lens L11 closest to the screen becomes a lens system with an image forming performance that is far superior to the referenced lens system that uses two aspherical lenses.

In this way, in the lens system according to the present invention, a negative meniscus lens is disposed closest to the screen, a wide field angle is obtained with a compact construction, and by using a single aspherical lens that has a large diameter, far superior aberration-correcting performance can be obtained by a lens system that costs less than a conventional lens system that uses two aspherical lenses. Accordingly, by using this lens system in various types of projector, it is possible to project much clearer images. In particular, by setting the refractive power of the aspherical lens relatively weakly, the construction can prevent a drop in aberration-correcting performance due to thermal deformation, so that even in a rear-projection type apparatus where the effects of heat are large, much clearer, stable images can be obtained by using the projection lens system according to the present invention. Also, although the present invention has been described based on a two-group lens system, the present invention can also be applied to a lens system with one or three or more groups. The present invention has been described based on a fixed focal length lens-type lens system where no lenses aside from the focusing lenses move, but the present invention can also be applied to a zoom lens system in which a lens or lens group for zooming also moves.

What is claimed is:

1. A projection lens system that projects projection light from a light modulator side to a screen side and which is telecentric on the light modulator side, the projection lens system comprising:
a first meniscus lens that is disposed closest to the screen side, is convex on the screen side, and has negative refractive power; and
a second meniscus lens that is disposed next closest to the screen side, is convex on the screen side, and has negative refractive power,
wherein the first meniscus lens is made of plastic and at least one out of two curved surfaces thereof is aspherical, and
a refractive power of the first meniscus lens is lower than a refractive power of the second meniscus lens,
wherein the projection lens system has an arrangement of eleven lenses that include the first meniscus lens and the second meniscus lens and are respectively negative, negative, negative, positive, negative, positive, positive, negative, positive, positive, and positive in order from the screen side, with only the first meniscus lens being an aspherical lens.

2. A projection lens system according to claim 1, wherein paraxial radii of curvature of both curved surfaces of the first meniscus lens are larger than a radius of curvature of a surface on the screen side of the second meniscus lens.

3. A projector comprising a projection lens system according to claim 1, and a light modulator directing light into the light modulator side.

* * * * *